(No Model.)
B. R. HAWLEY.
JOINT FOR AIR PIPES.
No. 292,306. Patented Jan. 22, 1884.
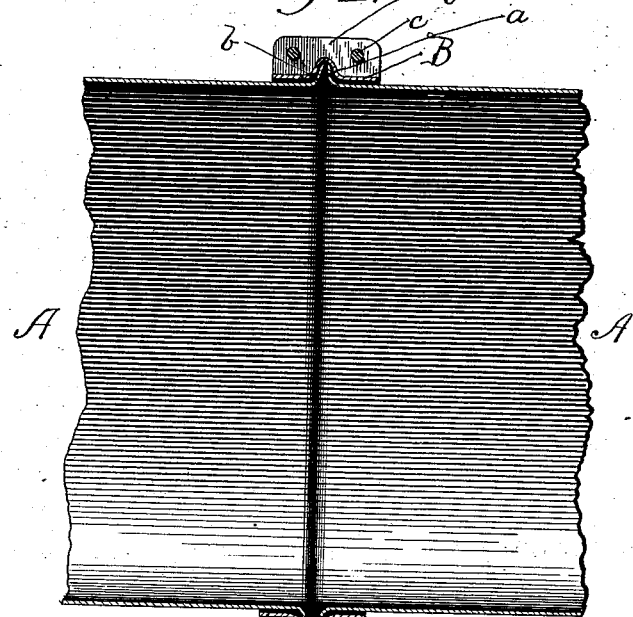
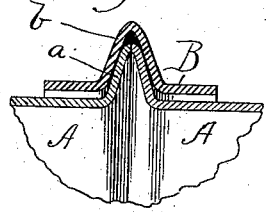
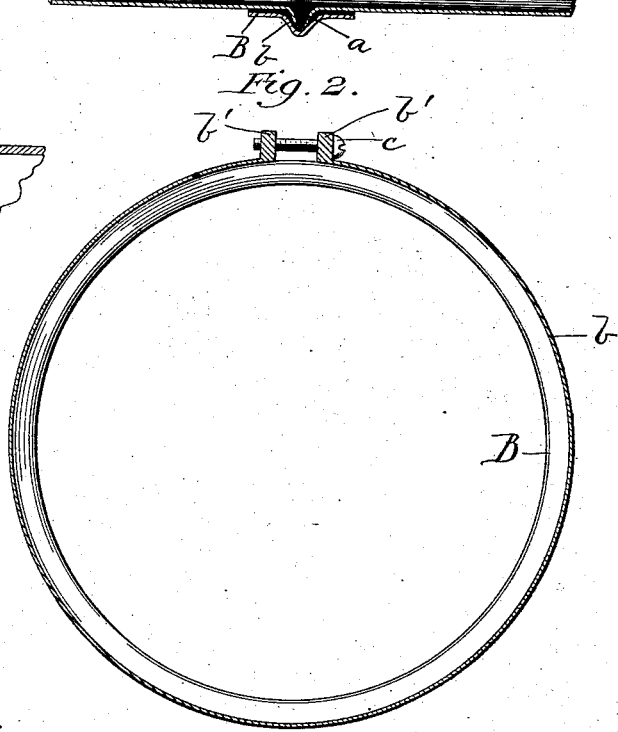
Witnesses:
J. Everett Brown
H. W. Munday
Inventor:
Benjamin R. Hawley
By Munday Evarts & Adcock
his attys

UNITED STATES PATENT OFFICE.

BENJAMIN R. HAWLEY, OF CHICAGO, ILLINOIS.

JOINT FOR AIR-PIPES.

SPECIFICATION forming part of Letters Patent No. 292,806, dated January 22, 1884.

Application filed April 23, 1883. (No model.)

*To all whom it may concern:*

Be it known that I, BENJAMIN R. HAWLEY, a citizen of the United States, residing in Chicago, in the county of Cook and State of Illinois, have invented a new and useful Improvement in Joints for Air-Pipes, of which the following is a specification.

My invention relates to improvements in the construction of the joints of the hot-air pipes employed in connection with heating-furnaces. It may also be used in other places where air-conveying tubes are used, and as a substitute for many of the ordinary forms of tubular joints.

The invention consists in providing the ends of the pipe which are to be united with outwardly-turned diagonal flanges adapted to meet at their edges, and surrounding the joint with a clamping-ring having an outward ridge which sets down upon the conjoined flanges of the pipe ends. This is more fully explained in the description about to be given, to which reference is hereby made.

In the accompanying drawings, which form a part of this specification, and in which similar letters of reference indicate like parts, Figure 1 is a longitudinal section through my improved joint. Fig. 2 is a section through the clamping-ring, and Fig. 3 is an enlarged section of the joint.

In said drawings, A A represent two lengths of pipe which are to be joined. Each of these is provided with a diagonal outward flange, $a$, which flanges, when the lengths are put together, meet at their outer edges, as already indicated. Surrounding the joint is the clamping-ring B, which throughout is ridged or beaded with a ridge, $b$, fitting down over the outstanding flanges, and so conforming to said flanges that it clamps them together the tighter it is drawn around the pipe by the tightening-screws $c$, inserted in the upturned end points, $b'$, of the ring. The conformation alluded to, by the interior of the ridge to the exterior of the flanges, is obtained by making said ridge in inverted-V-shape in cross-section, and it is desirable that the outer surfaces of the flanges be made slightly rounding or convex, so that a line will be formed upon which the converging sides of the ridge may act. The ring does not, of course, conform so closely to the exterior of the adjoining straight parts of the pipe as to prevent this clamping action by the ridge upon the flanged parts; and in order to allow the longitudinal movement caused by changes of temperature, room should be left at the base of the flanges, between them and the base of the ridge. These features are illustrated in Figs. 1 and 3, though perhaps upon a somewhat exaggerated scale for the sake of clearness. The pipe thus joined may be put together in places where the ordinary forms of joint could not be employed by reason of inaccessibility.

I claim—

The combination, with the pipes A A, having the diagonal flanges $a$, meeting at their outer edges, of the ridged clamping-ring provided with a tightening device, room being left between the base of the ring and the pipe to permit tightening of the ring and lengthening of the pipe, substantially as and for the purpose set forth.

B. R. HAWLEY.

Witnesses:
 H. M. MUNDAY,
 T. EVERETT BROWN.